(12) United States Patent
Mitchell

(10) Patent No.: US 9,733,121 B1
(45) Date of Patent: Aug. 15, 2017

(54) PUPIL DIVISION MULTIPLEXED IMAGING SYSTEMS

(71) Applicant: Thomas A. Mitchell, Nazareth, PA (US)

(72) Inventor: Thomas A. Mitchell, Nazareth, PA (US)

(73) Assignee: Wavefront Research, Inc., Bethlehem, PA (US)

( * ) Notice: Subject to any disclaimer, the term of this patent is extended or adjusted under 35 U.S.C. 154(b) by 315 days.

(21) Appl. No.: 14/212,635

(22) Filed: Mar. 14, 2014

Related U.S. Application Data

(60) Provisional application No. 61/782,823, filed on Mar. 14, 2013.

(51) Int. Cl.
  *G01J 3/18* (2006.01)
  *G01J 1/04* (2006.01)
  *G01J 1/42* (2006.01)

(52) U.S. Cl.
  CPC ............. *G01J 1/0407* (2013.01); *G01J 1/42* (2013.01)

(58) Field of Classification Search
  CPC .................. G01J 3/18; G01J 3/28; G01J 3/40
  USPC ............... 250/208.1, 216; 356/326, 327, 328
  See application file for complete search history.

(56) References Cited

U.S. PATENT DOCUMENTS

| 7,061,611 | B2 * | 6/2006 | Mitchell | G01J 3/18 356/328 |
| 8,203,710 | B1 * | 6/2012 | Mitchell | G01J 3/0208 356/328 |

\* cited by examiner

*Primary Examiner* — Kevin Pyo
(74) *Attorney, Agent, or Firm* — Burns & Levinson LLP; Orlando Lopez

(57) ABSTRACT

The present disclosure provides an imaging optical system. In one aspect, the imaging optical system includes, among other things, a light bending element configured to substantially separate electromagnetic radiation into at least two portions, and configured to redirect the at least two portions of said electromagnetic radiation into substantially different directions.

18 Claims, 16 Drawing Sheets

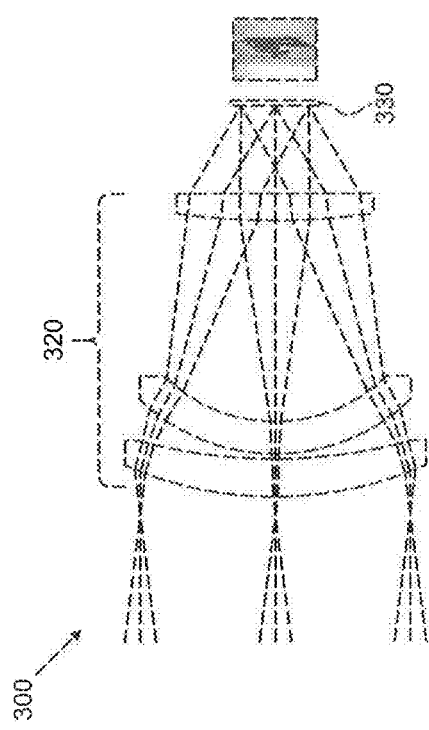
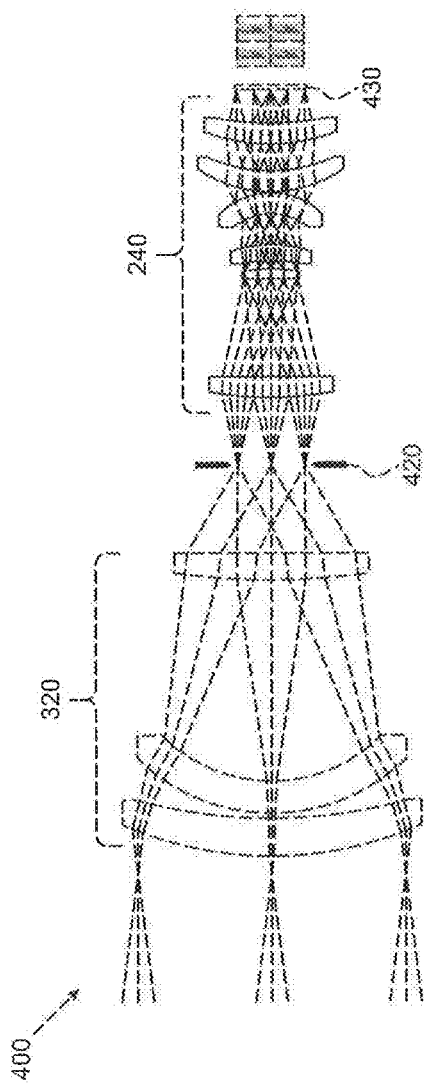

PUPIL DIVISION MULTIPLEXED IMAGING SYSTEMS

CROSS-REFERENCE TO RELATED APPLICATION

This application claims priority to U.S. Provisional Application No. 61/782,823, entitled "PUPIL DIVISION MULTIPLEXED IMAGING SYSTEMS," filed on Mar. 14, 2013, the entire contents of which are incorporated herein by reference and for all purposes.

BACKGROUND

These teachings relate generally to optical relay imagers.

There is a need for optical imagers that can combine spatial, spectral, hyperspectral, and polarimetric imaging sensors, that provide multiple images and that are more compact and higher performance than conventional designs.

SUMMARY

Various embodiments of the present disclosure locate a segmented light redirection device, including but not limited to a prism, resulting in multiple images of the source object. These embodiments provide combinations of spatial, spectral, hyperspectral, and polarimetric imaging capability that are more compact and higher performance than conventional systems.

While relay imagers are known in the art, a relay imager that is capable of providing multiple and separated images of the object at a common focus plane can provide the basis for a new class of novel multispectral, polarimetric, hyperspectral, and hyperspectral polarimetric imagers. By introducing a segmented element substantially located near the collimated region or pupil of the relay imager, it can be used to form multiple images of the source object at the detector. This makes multiple relay imaging systems of the present disclosure more compact than conventional designs, while providing superior spatial and spectral image quality.

Certain characteristics of the present disclosure provide a relay imager design that provides multiple images of the object.

Further characteristics of the present disclosure provide a relay imager design that provides high spatial co-registration of the multiple images.

Further characteristics of the present disclosure provide a relay imager design that is compact in physical size.

Further characteristics of the present disclosure provide a relay imager design that is low in mass.

Further characteristics of the present disclosure provide a relay imager design that provides multiple spectral images of the object.

Further characteristics of the present disclosure provide a relay imager design that provides multiple polarized images of the object.

Further characteristics of the present disclosure provide a relay imager design that provides multiple dispersed images of the object.

Further characteristics of the present disclosure provide a relay imager design that provides multiple polarized dispersed images of the object.

Further characteristics of the present disclosure provide a hyperspectral imager design that has a high degree of spatial and spectral image quality.

Further characteristics of the present disclosure provide a hyperspectral imager design that has low spatial and spectral image distortions.

Further characteristics of the present disclosure provide a relay imager design that provides the user with the capability to readily change its spatial, spectral, and polarimetric characteristics.

Still further characteristics of the present disclosure provide a relay design that has a combination of the characteristics described above with superior trade-offs than have been previously attainable.

For a better understanding of the present disclosure, together with other and further characteristics thereof, reference is made to the accompanying drawings and detailed description.

BRIEF DESCRIPTION OF THE DRAWINGS

FIG. 6A is a schematic view of an optical imager, taken along its optical axis, in accordance with an embodiment of the present disclosure;

FIG. 6B is a schematic view of the optical imager illustrated in FIG. 6A with the optical imaging system illustrated in FIG. 2 optically disposed between the image plane of the imaging lens and the detector, taken along its optical axis, in accordance with an embodiment of the present disclosure;

DETAILED DESCRIPTION

Embodiments of optical relay imagers that include, but not limited to, combinations of spatial, spectral, hyperspectral, and polarimetric imaging sensors, that provide multiple images and that are more compact and higher performance than conventional designs are disclosed hereinbelow.

Figure 1:
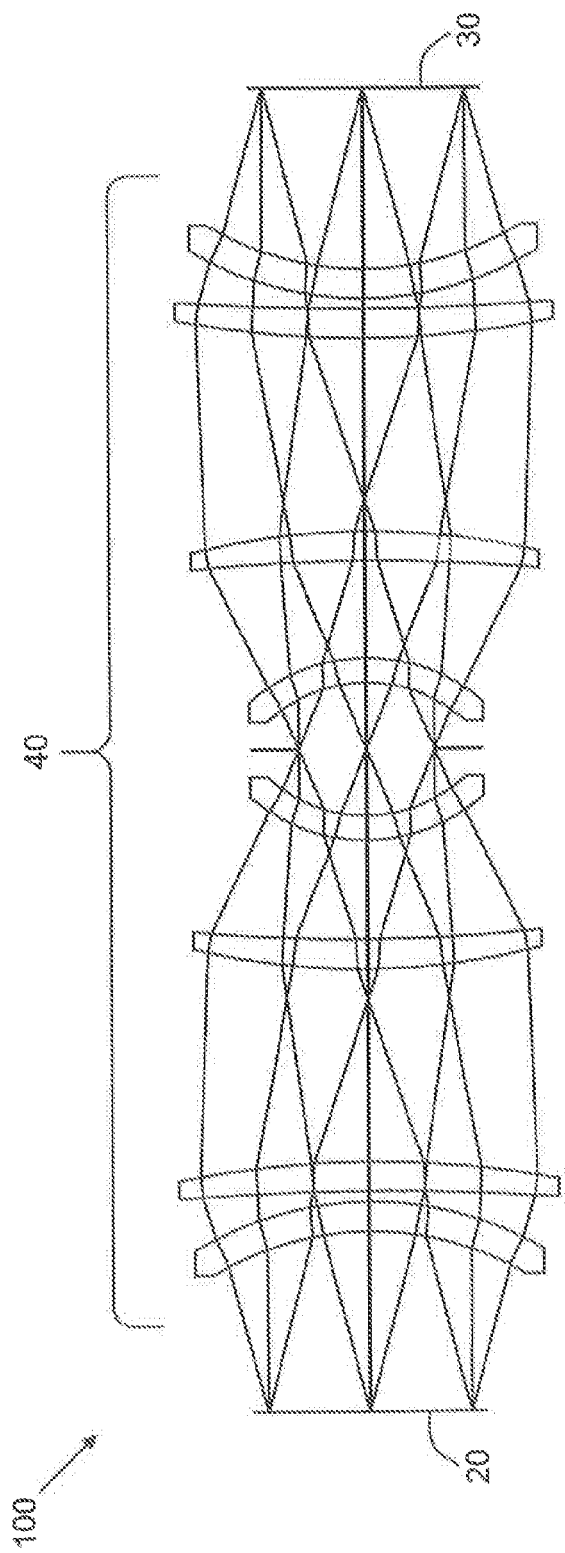
FIG. 1 is a schematic view of a conventional refractive relay imaging system, taken along its optical axis.

Reference is made to FIG. 1, which is a schematic view of a conventional relay imaging system 100. Electromagnetic radiation (typically in the ultraviolet, visible, and/or infrared bands, hereinafter referred to generally as light) emitted or reflected by a given object (either real or virtual, hereinafter referred to generally as the source) located at the object plane 20 is re-imaged to a focus position (hereinafter also referred to as an image plane), such as but not limited to a CCD array, phosphorescent screen, photographic film, microbolometer array, or other means of detecting light energy (hereinafter referred to generally as a detector 30) through an optical system 40 comprising either refractive or reflective elements, or combination thereof.

Figure 2:
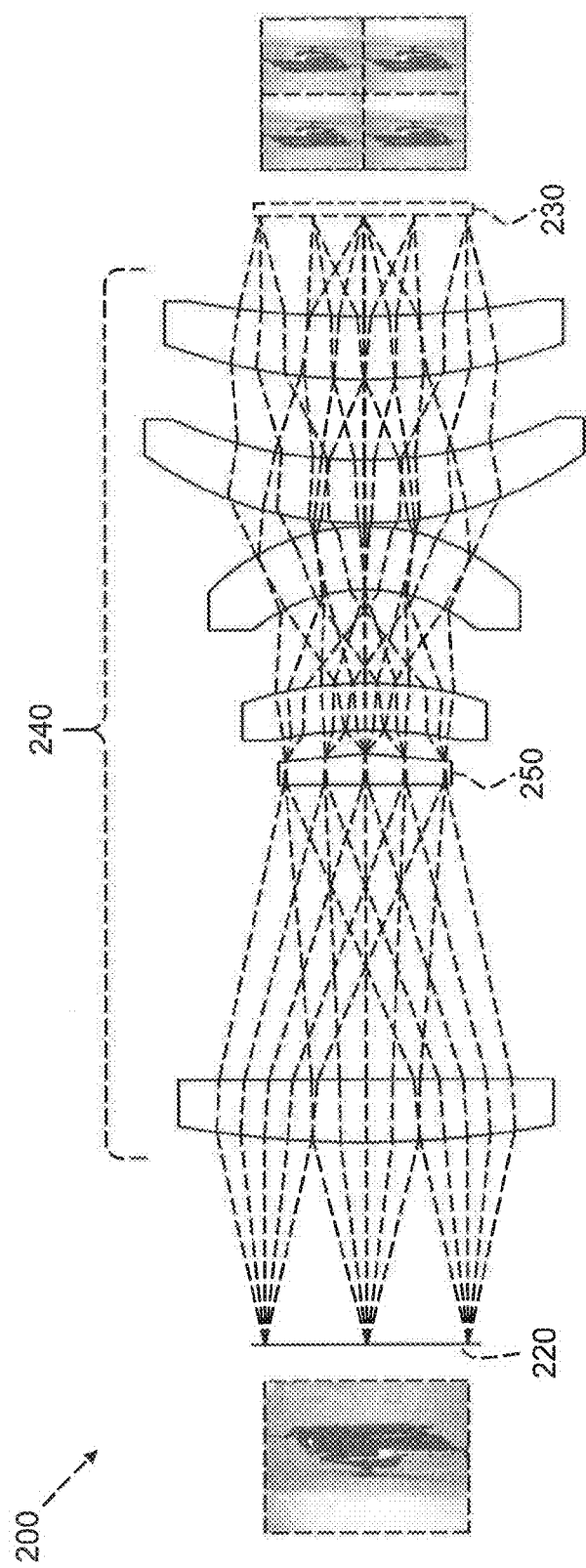
FIG. 2 is a schematic view of an optical imaging system taken along its optical axis, in accordance with an embodiment of the present disclosure.

FIG. 2 illustrates a schematic view of optical imaging system 200, taken along its optical axis, in accordance with an embodiment of the present disclosure. As shown in FIG. 2, optical imaging system 200 includes a segmented light bending element 250, such as but not limited to a segmented prism, being inserted in a substantially collimated region of an imaging relay lens 240. In this embodiment, the imaging relay lens 240 of optical imaging system 200 has a magnification of about 0.5, but in principle it can have unity or any other magnification, depending on design choices.

Figure 3A:
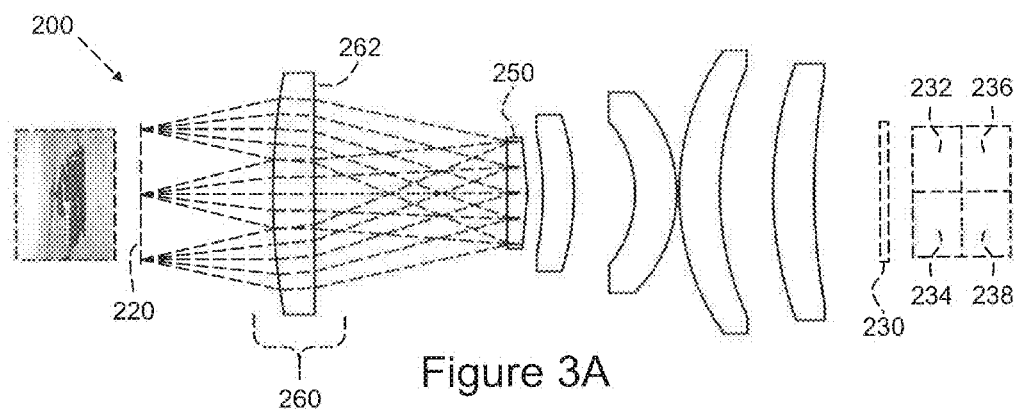
FIGS. 3A-3C are schematic views of the optical imaging system illustrated in FIG. 2, taken along its optical axis, in accordance with an embodiment of the present disclosure.
Figure 3B:
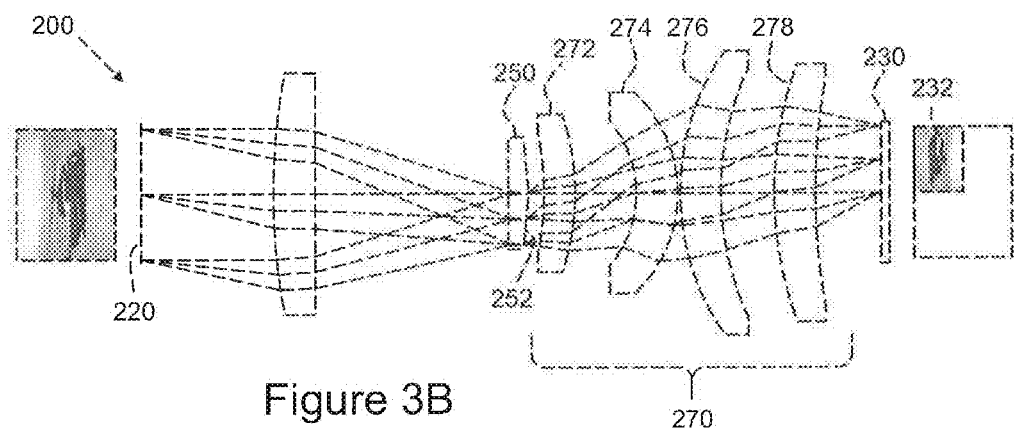
Figure 3C:
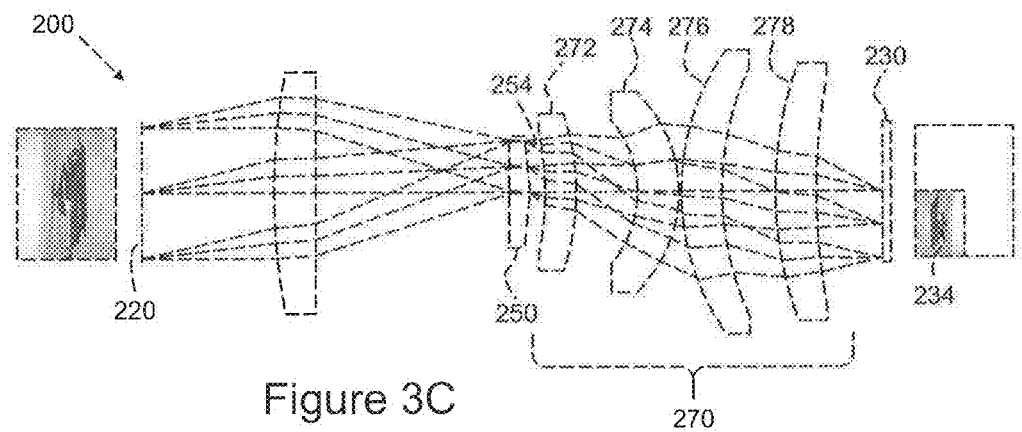

FIGS. 3A-3C illustrate imaging characteristics of the optical imaging system 200 as illustrated in FIG. 2. Referring now to FIG. 3A, light emitted or reflected by a source located at the object plane 220 is incident on a first portion 260 of optical imaging system 200. In this embodiment, first portion 260 of optical imaging system 200 comprises, but is not limited to, a refractive element 262, which is capable of substantially receiving a portion of the light emanating from the object plane 220 and substantially collimating the light. The light is then incident upon a segmented prism 250, which is capable of substantially receiving the light from the first portion 260 of the optical imaging system 200 and separating the light into multiple portions.

Referring to FIG. 3B, a first segment 252 of the segmented prism 250 imparts a first change in the direction of propagation of a first portion of the light that is incident upon the first segment 252. This redirected first portion of the light is then incident on a second portion 270 of the optical imaging system 200. In this embodiment, second portion 270 comprises, but is not limited to, refractive elements 272, 274, 276, and 278, which is capable of substantially receiving the light from the first segment 252 of the segmented prism 250 and substantially focusing the light to an image plane of a detector 230. The change in the direction of propagation of the first portion of the light imparted by the first segment 252 of the segmented prism 250 imparts a first shift in the spatial location of the image 232 on the detector 230.

Referring to FIG. 3C, a second segment 254 of the segmented prism 250 imparts a second change in the direction of propagation of a second portion of the light that is incident upon the second segment 254. This redirected second portion of the light is then incident on the second portion 270 of the imaging optical system, which is capable of substantially receiving the light from the second segment 254 of the segmented prism 250 and substantially focusing the light to the detector 230. The change in the direction of propagation of the second portion of the light imparted by the second segment 254 of the segmented prism 250 imparts a second shift in the spatial location of the image 234 on the detector 230.

This reimaging and redirection of the source occurs for the portions of the light that are incident on the segments 252, 254, 256, and 258 of the segmented prism 250, resulting in a plurality of images 232, 234, 236, and 238 respectively on the detector 230 that are spatially located at substantially different locations on the detector 230. The redirection properties of the individual segments 252, 254, 256, and 258 of the segmented prism 250 can be designed to place the associated images on the detector 230 at predefined locations, such as but not limited to a tiled non-overlapping pattern. The precision to which these images are aligned with one another and can be co-registered is partially driven by the accuracy with which the individual segments of the segmented prism 250 are fabricated with respect to one another.

Figure 4A:
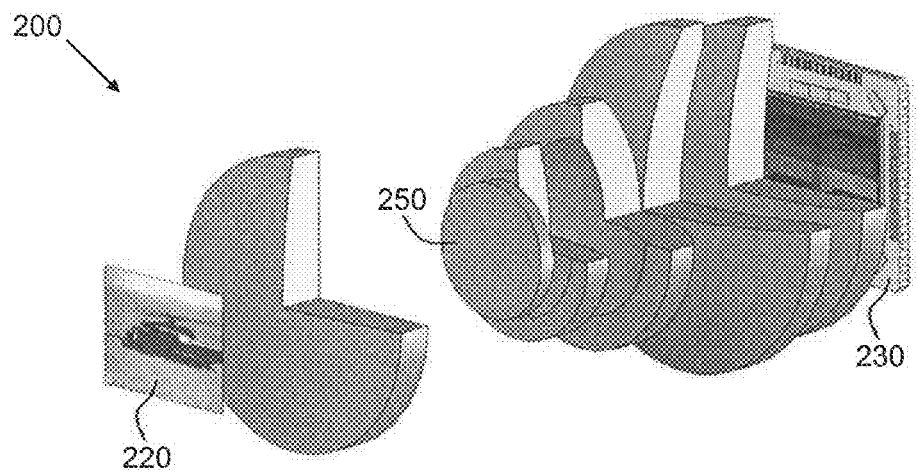
FIGS. 4A-4B are isometric cutaway views of the optical imaging system illustrated in FIG. 2, in accordance with an embodiment of the present disclosure.
Figure 4B:
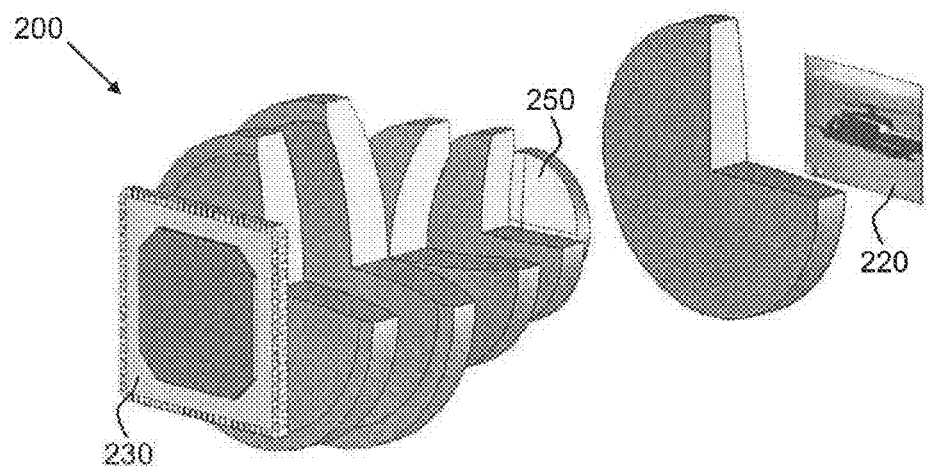

FIGS. 4A-4B are isometric cutaway views the optical imaging system 200 illustrated in FIG. 2, in accordance with an embodiment of the present disclosure. Referring to FIG. 4A, the isometric cutaway view of optical imaging system 200 is taken from the direction of object plane 220, illustrating the spatial relationship between the object plane 220, the segmented prism 250, and the multiplexed images that are substantially focused onto the detector 230. Referring to FIG. 4B, the isometric cutaway view of optical imaging system 200 is taken from the direction of detector 230, further illustrating the spatial relationship between the object plane 220, the segmented prism 250, and the multiplexed images that are substantially focused onto the detector 230.

Figure 5:
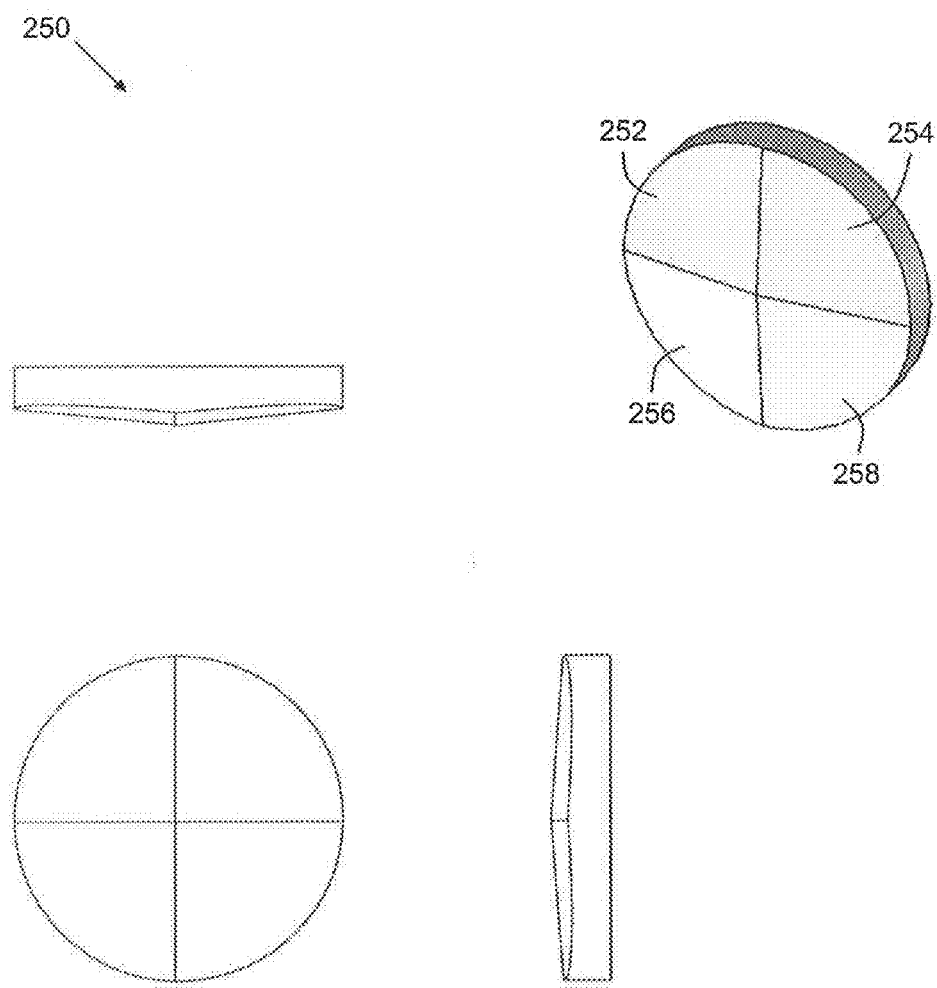
FIG. 5 is a mechanical drawing of the segmented prism component of the optical imaging system illustrated in FIG. 2, in accordance with an embodiment of the present disclosure.

FIG. 5 illustrates a mechanical drawing and an isometric view of the segmented prism 250 of optical imaging system 200 illustrated in FIG. 2, in accordance with an embodiment of the present disclosure. In this embodiment, the segmented prism 250 comprises four segments 252, 254, 256, and 258, each occupying one quadrant of the aperture and having a faceted surface. In practice, this surface can have any number of mechanical or optical properties such as but not limited to optical power, diffractive surfaces, spectral or polarization filters, etc., provided that the surface imparts a change in the direction of the light incident upon it relative to the light incident upon the other segments.

Reference is made to FIG. 6A, which is a schematic view of a imaging system 300, in accordance with an embodiment of the present disclosure, despite that the working principles of which may be known in the art. Light, emitted or reflected by a source, is imaged to the image plane 330 through an optical imaging system 320, in this embodiment comprising, but not limited to, refractive or reflective elements or combination thereof.

By selecting the magnification of the imaging relay lens 240 of optical imaging system 200 illustrated in FIG. 2 such that the physical size of the combined array of segmented images on the detector 230 is substantially the same size as the object plane 220, the optical imaging system 200 can be designed such that it can be optically disposed to substantially receive a portion of the light from an optical imaging system to add multiplexed image capability to the combined optical imaging system not available in the original imaging system itself.

Referring to FIG. 6B, there is illustrated a schematic view of an optical imaging system 400 including the optical imager 300 of FIG. 6A in combination with the optical imaging system 200 of FIG. 2 optically disposed between image plane 330 of imaging lens 320 and detector 430, taken along its optical axis, in accordance with an embodiment of the present disclosure. In this embodiment, optical imaging system 200 illustrated in FIG. 2 is optically disposed to substantially receive a portion of the light from the imaging lens 320 of imaging system 300 illustrated in FIG. 6A, such that the object plane 220 of optical imaging system 200 illustrated in FIG. 2 is substantially located at the image plane 330 of imaging system 300 illustrated in FIG. 6A.

In operation, light emitted or reflected by a source, is imaged to the image plane 330 through the optical imaging system 320 comprising refractive or reflective elements or combination thereof. The light is incident on an aperture (such as but not limited to a field stop, hereinafter referred to generally as a field stop 420), which is capable of substantially receiving light emanating from the optical imaging system 320 and is located substantially at the image plane 330 of the imaging system 300 illustrated in FIG. 6A. The light is then incident on the imaging relay lens 240 of optical imaging system 200 illustrated in FIG. 2, which is capable of substantially receiving the light from the imaging system 300 and substantially reimaging to detector 230 a plurality of images that are spatially located at substantially different locations on the detector 230.

Figure 7:
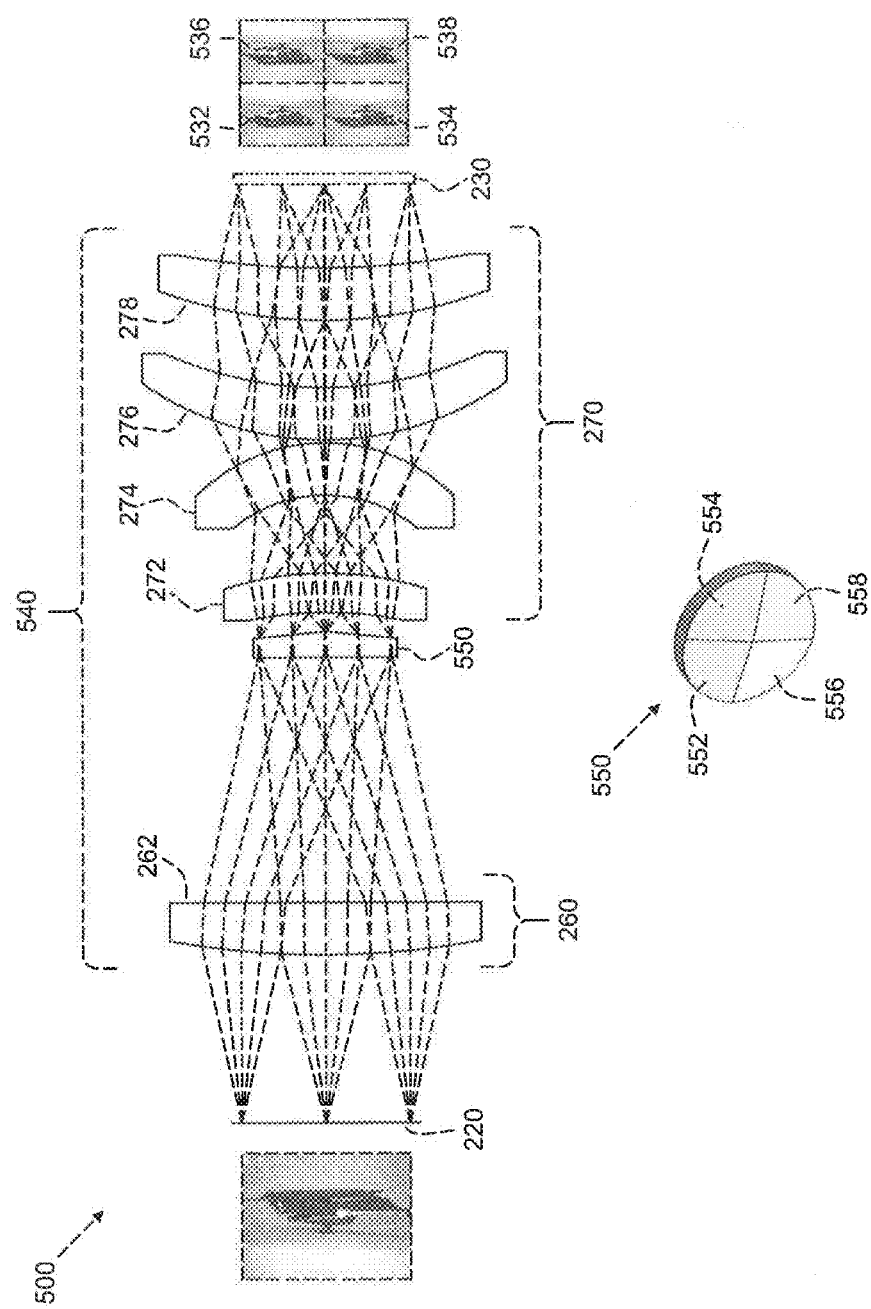
FIG. 7 is a schematic view of a multispectral imager of an optical imaging system, taken along its optical axis, in accordance with an embodiment of the present disclosure.

FIG. 7 illustrates a schematic view of a multispectral imager of an optical imaging system 500, taken along its optical axis, in accordance with an embodiment of the present disclosure. In this embodiment, individual segments of the segmented prism 250 of optical imaging system 200 illustrated in FIG. 2 is further made up of individual spectral bandpass optical filters on each of the segments 252, 254, 256, and 258 on the segmented prism 250, such that the individual images 532, 534, 536, and 538 on the detector 230 have different spectral content, as illustrated in the schematic view of FIG. 7. In this embodiment, the optical imaging system behaves similarly to a multispectral imager that is more compact then conventional designs. In practice, this design can be used to acquire the spectral content of the object in some number of spectral bands.

Referring to FIG. 7, light emitted or reflected by a source located at the object plane 220 is incident on a first portion 260 of an imaging optical system comprising refractive element 262, which is capable of substantially receiving a portion of the light emanating from the object plane 220 and substantially collimating the light. The light is then incident upon a segmented prism 550, which is capable of substantially receiving the light from the first portion 260 of the optical system and separating the light into multiple portions. A first segment 552 of the segmented prism 550, which is capable of substantially receiving a first spectral portion of the light, imparts a first change in the direction of propagation of the first portion of the light that is incident upon the first segment 552. This redirected first spectral portion of the light is then incident on a second portion 270 of the imaging optical system comprising refractive elements 272, 274, 276, and 278, which is capable of substantially receiving the first spectral portion of the light from the first segment 552 of the segmented prism 550 and substantially focusing the light to the detector 230. The change in the direction of propagation of the first spectral portion of the light imparted by the first segment 552 of the segmented prism 550 imparts a first shift in the spatial location of the spectral image 532 on the detector 230.

A second segment 554 of the segmented prism 550, which is capable of substantially receiving a second spectral portion of the light, imparts a second change in the direction of propagation of the second portion of the light that is incident upon the second segment 554. This redirected second spectral portion of the light is then incident on the second portion 270 of the imaging optical system, which is capable of substantially receiving the second spectral portion of the light from the second segment 552 of the segmented prism 550 and substantially focusing the light to the detector 230. The change in the direction of propagation of the second spectral portion of the light imparted by the second segment 554 of the segmented prism 550 imparts a second shift in the spatial location of the image 534 on the detector 230. This reimaging and redirection of the source occurs for the portions of the light that are incident on the segments 552, 554, 556, and 558 of the segmented prism 550, resulting in a plurality of images 532, 534, 536, and 538 respectively on the detector 230 that are spatially located at substantially different locations on the detector 230.

Figure 8:
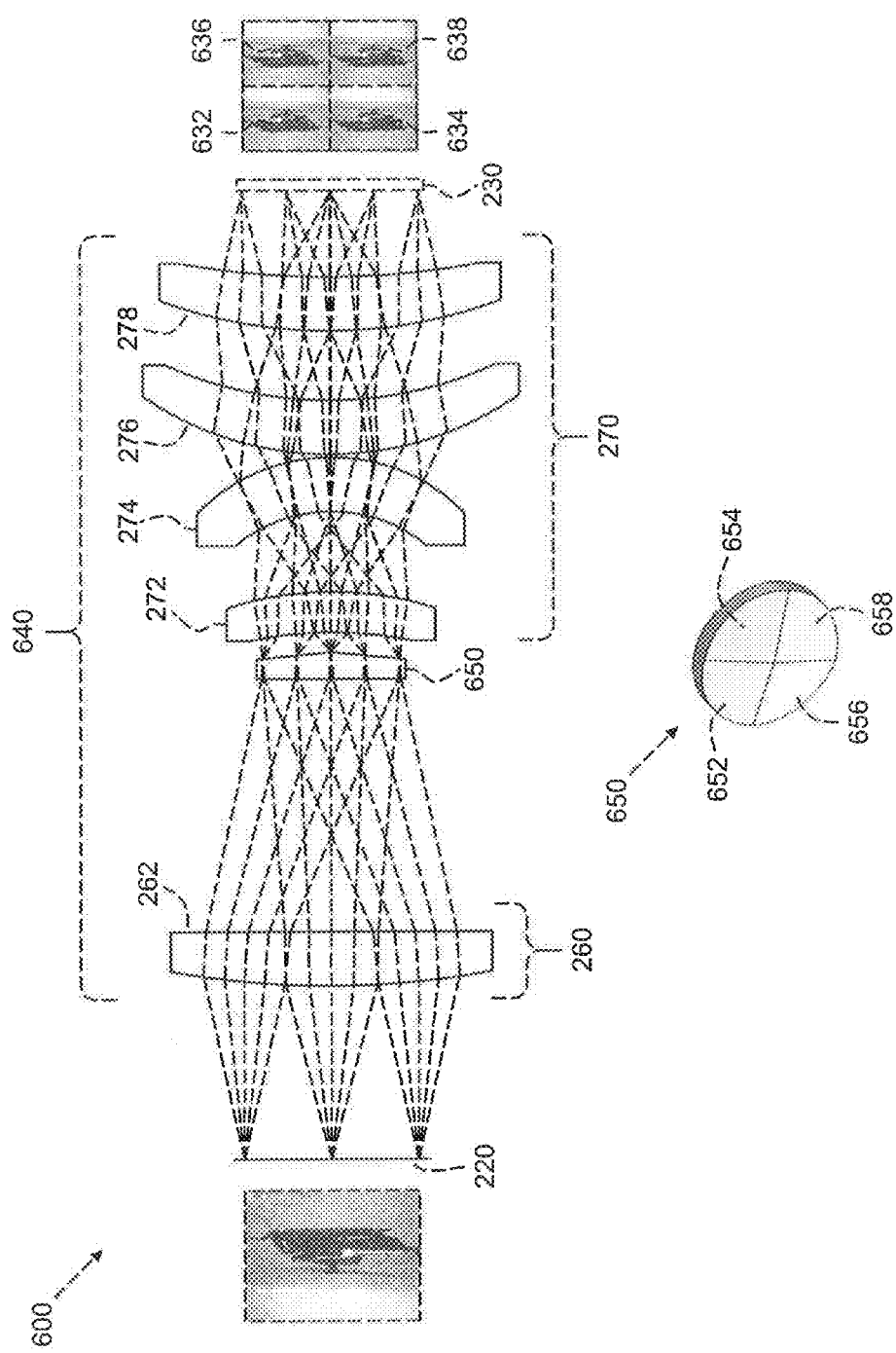
FIG. 8 is a schematic view of an optical imaging system taken along its optical axis, in accordance with another embodiment of the present disclosure.

FIG. 8 is a schematic view of an optical imaging system 600 taken along its optical axis, in accordance with another embodiment of the present disclosure. In this embodiment, individual segments of the segmented prism 250 of optical imaging system 200 illustrated in FIG. 2 further comprises individual polarization optical filters on each of the segments 252, 254, 256, and 258 on the segmented prism 250, such that the individual images 632, 634, 636, and 638 on the detector 230 have different polarization content, as illustrated in FIG. 8. In this embodiment, the optical imaging system 600 behaves similarly to a polarimetric imager that is more compact then conventional designs. In practice, this design can be used to acquire the four Stokes vector components and provide the polarization content of the object.

Referring to FIG. 8, light emitted or reflected by a source located at the object plane 220 is incident on a first portion 260 of an imaging optical system comprising refractive element 262, which is capable of substantially receiving a portion of the light emanating from the object plane 220 and substantially collimating the light. The light is then incident upon a segmented prism 650, which is capable of substantially receiving the light from the first portion 260 of the optical system and separating the light into multiple portions.

A first segment 652 of the segmented prism 650, which is capable of substantially receiving a first polarization portion of the light, imparts a first change in the direction of propagation of the first portion of the light that is incident upon the first segment 652. This redirected first polarization portion of the light is then incident on a second portion 270 of the imaging optical system, comprising refractive elements 272, 274, 276, and 278, which is capable of substantially receiving the first polarization portion of the light from the first segment 652 of the segmented prism 650 and substantially focusing the light to the detector 230. The change in the direction of propagation of the first polarization portion of the light imparted by the first segment 652 of the segmented prism 650 imparts a first shift in the spatial location of the polarization image 632 on the detector 230.

A second segment 654 of the segmented prism 650, which is capable of substantially receiving a second polarization portion of the light, imparts a second change in the direction of propagation of the second portion of the light that is incident upon the second segment 654. This redirected second polarization portion of the light is then incident on the second portion 270 of the imaging optical system, which is capable of substantially receiving the second polarization portion of the light from the second segment 652 of the segmented prism 650 and substantially focusing the light to the detector 230. The change in the direction of propagation of the second polarization portion of the light imparted by the second segment 654 of the segmented prism 650 imparts a second shift in the spatial location of the image 634 on the detector 230. This reimaging and redirection of the source occurs for the portions of the light that are incident on the segments 652, 654, 656, and 658 of the segmented prism 650, resulting in a plurality of images 632, 634, 636, and 638 respectively on the detector 230 that are spatially located at substantially different locations on the detector 230.

Figure 9:
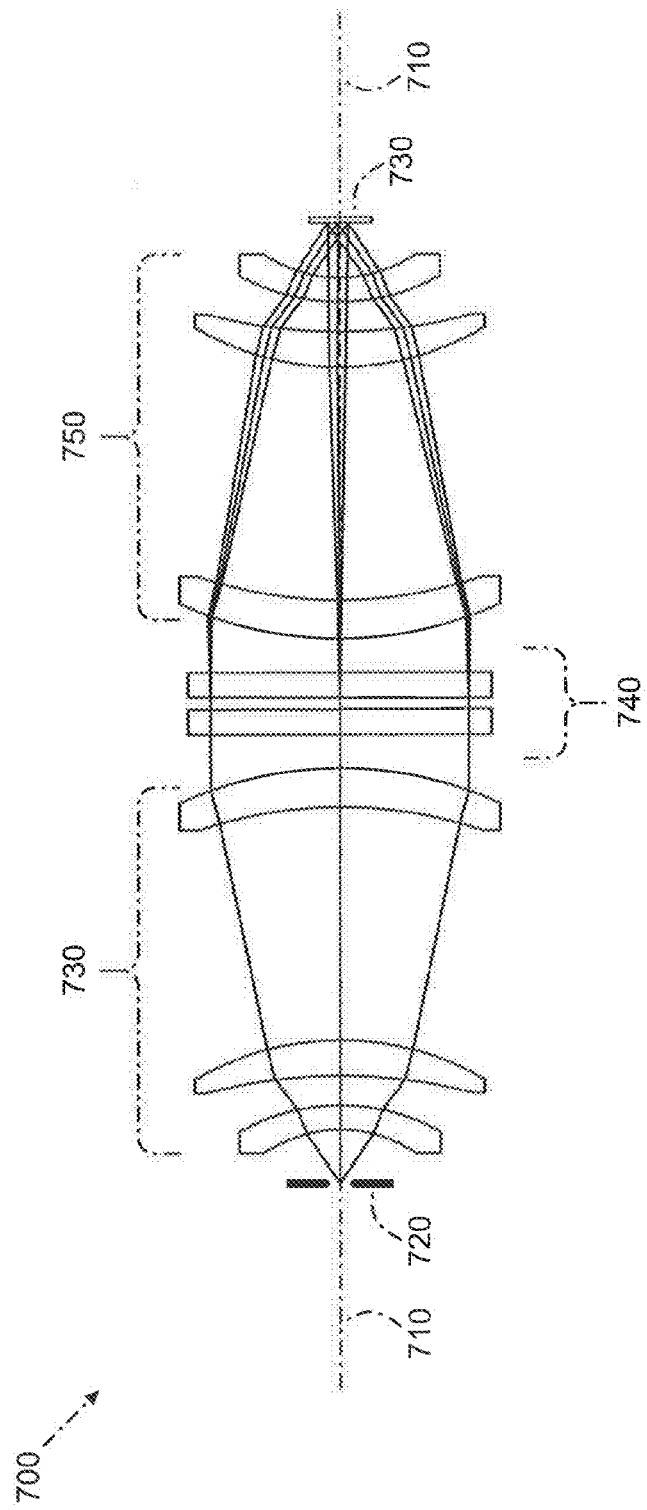
FIG. 9 is a schematic view of a conventional compact refractive relay spectrometer, taken along its optical axis in the plane parallel to the direction of dispersion.

Reference is made to FIG. 9, which is a schematic sectional view of a refractive relay spectrometer 700, taken along its optical axis 710 in the plane parallel to the direction of dispersion. See, for example, U.S. Pat. No. 7,061,611, which is incorporated here by reference in its entirety for all purposes. In operation, light emitted or reflected by a source located substantially at a slit element 720, is incident on a first portion 730 of the optical system, which is capable of substantially receiving a portion of the light emanating from the slit 720 and substantially collimating the light. The light is then incident on a dispersing element or group of elements 740, comprising a pair of transmission diffraction gratings (or any means of angularly separating light energy according to its wavelength, hereinafter referred to generally as a dispersing element), which is capable of substantially receiving the light from the first portion 730 of the optical system and dispersing it according to its wavelength. The dispersed light is then incident on a second portion 750 of the optical system, which is capable of substantially receiving the light from the dispersing element 740 and substantially focusing the light to a detecting element 760.

Figure 10:
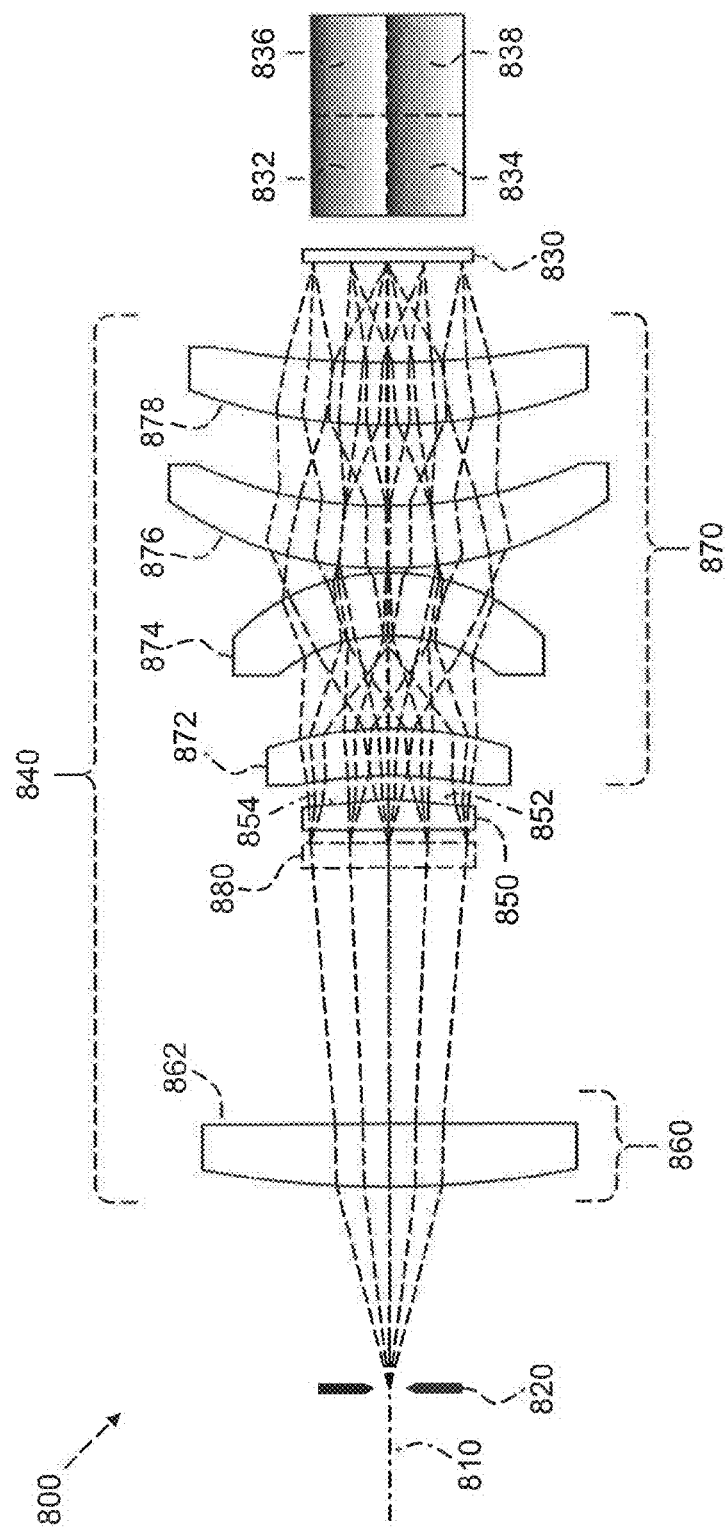
FIG. 10 is a schematic view of a hyperspectral imager of an optical imaging system, taken along its optical axis in the plane parallel to the direction of dispersion, in accordance with another embodiment of the present disclosure.

FIG. 10 is a schematic view of a hyperspectral imager of an optical imaging system 800, taken along its optical axis in the plane parallel to the direction of dispersion, in accordance with another embodiment of the present disclosure. In this embodiment, a segmented light bending element 850, such as but not limited to a segmented prism, is inserted in a substantially collimated region of a refractive relay spectrometer 840, as illustrated in FIG. 10, taken along its optical axis 810 in the plane parallel to the direction of dispersion. In this embodiment, the refractive relay spectrometer 840 has a magnification of 0.5. It is appreciated, however, that refractive relay spectrometer 840 can have a magnification of unity or any other desired magnification. It is further appreciated that the segmented light bending element 850 can be optically disposed either before or after the dispersing element of the spectrometer 840.

Referring to FIG. 10, light emitted or reflected by a source located substantially at a slit element 820 is incident on a first portion 860 of an imaging optical system comprising refractive element 862, which is capable of substantially receiving a portion of the light emanating from the object plane 820 and substantially collimating the light. The light is then incident on a dispersing element 880, which is capable of substantially receiving the light from the first portion 860 of the imaging optical system and substantially dispersing it according to its wavelength. The light is then incident upon a segmented prism 850, which is capable of substantially receiving the light from the dispersing element 880 and separating the light into multiple portions.

A first segment 852 of the segmented prism 850, which is capable of substantially receiving a first portion of the light, imparts a first change in the direction of propagation of the first portion of the light that is incident upon the first segment 852. This redirected first portion of the light is then incident on a second portion 870 of the imaging optical system comprising refractive elements 872, 874, 876, and 878, which is capable of substantially receiving the first portion of the light from the first segment 852 of the segmented prism 850 and substantially focusing the light to the detector 830. The change in the direction of propagation of the first portion of the light imparted by the first segment 852 of the segmented prism 850 imparts a first shift in the spatial location of the dispersed image 832 on the detector 830.

A second segment 854 of the segmented prism 850, which is capable of substantially receiving a second portion of the light, imparts a second change in the direction of propagation of the second portion of the light that is incident upon the second segment 854. This redirected second portion of the light is then incident on the second portion 870 of the imaging optical system, which is capable of substantially receiving the second portion of the light from the second segment 852 of the segmented prism 850 and substantially focusing the light to the detector 830. The change in the direction of propagation of the second portion of the light imparted by the second segment 854 of the segmented prism 850 imparts a second shift in the spatial location of the dispersed image 834 on the detector 830. This reimaging and redirection of the source occurs for the portions of the light that are incident on the segments 852, 854, or two other segments of the segmented prism 850, resulting in a plurality of dispersed images 832, 834, 836, and 838 respectively on the detector 830 that are spatially located at substantially different locations on the detector 830.

Figure 11:
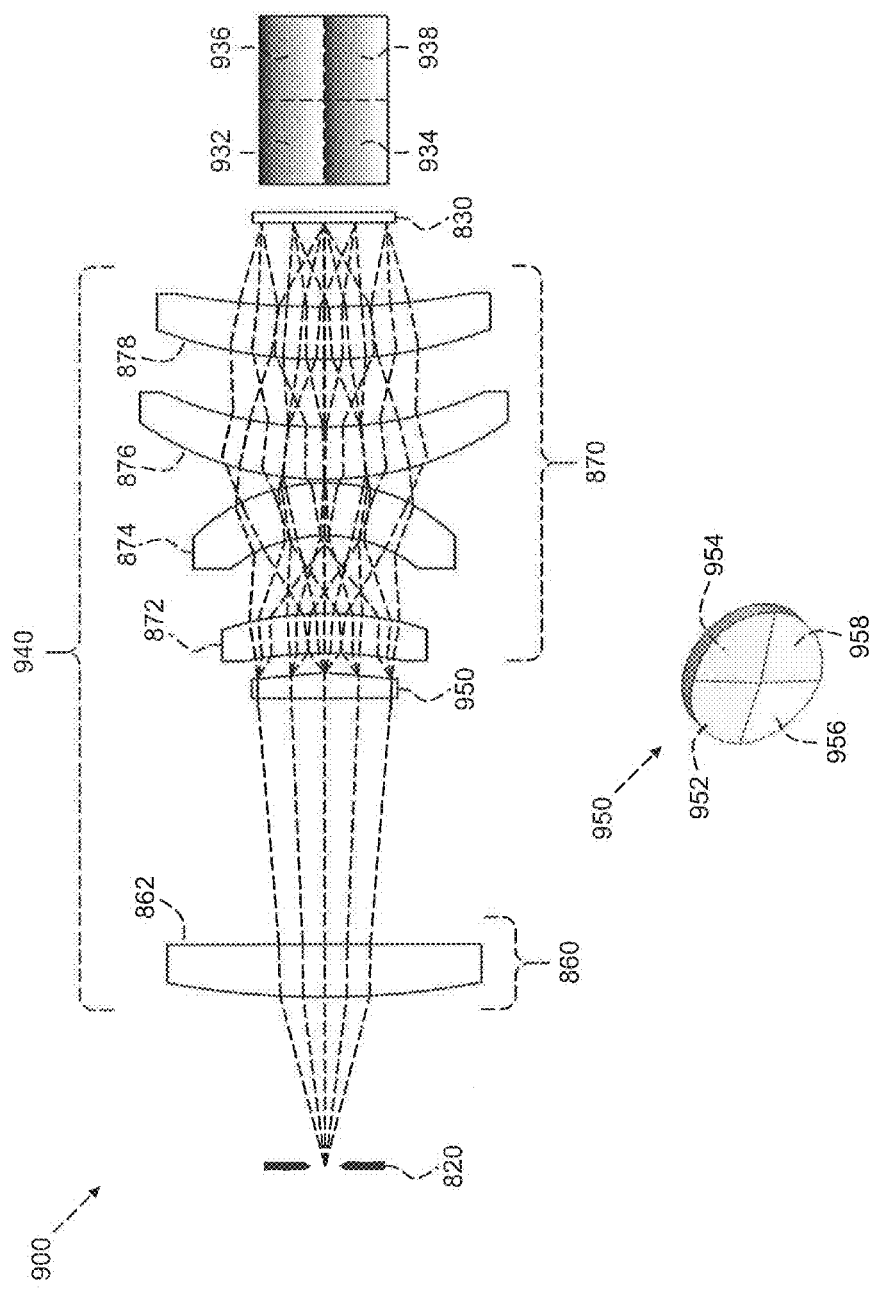
FIG. 11 is a schematic view of a hyperspectral imager of an optical imaging system, taken along its optical axis in the plane parallel to the direction of dispersion, in accordance with another embodiment of the present disclosure.

FIG. 11 is a schematic view of a hyperspectral imager of an optical imaging system, taken along its optical axis in the plane parallel to the direction of dispersion, in accordance with another embodiment of the present disclosure. In this embodiment, the segmented prism component 850 and the dispersive element 880 of FIG. 10 are combined to form a segmented dispersive element 950. This segmented dispersive element 950 can comprise any combination of refractive, diffractive, prismatic, etc., elements, such as but not limited to prism elements, provided that the individual surfaces impart a change in the direction of the light incident upon it relative to the light incident upon the other segments, and that the light is further angularly separated according to its wavelength. The imaging characteristics of the optical imaging system 900 illustrated in FIG. 11 are shown in the schematic views of FIGS. 12A-12C, taken along its optical axis in the plane parallel to the direction of dispersion.

Figure 12A:
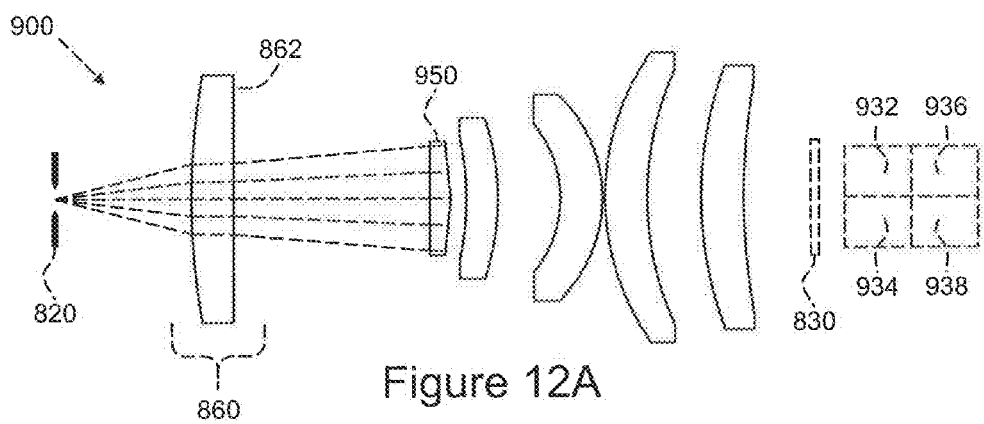
FIGS. 12A-12C are schematic views of the optical imaging system illustrated in FIG. 11, taken along its optical axis in the plane parallel to the direction of dispersion, in accordance with an embodiment of the present disclosure.

Referring to FIG. 12A, light emitted or reflected by a source located substantially at a slit element 820 is incident on a first portion 860 of an imaging optical system comprising refractive element 862, which is capable of substantially receiving a portion of the light emanating from the slit element 220 and substantially collimating the light. The light is then incident upon a segmented dispersive element 950, which is capable of substantially receiving the light from the first portion 860 of the optical system and separating the light into multiple portions and dispersing the light according to its wavelength.

Figure 12B:
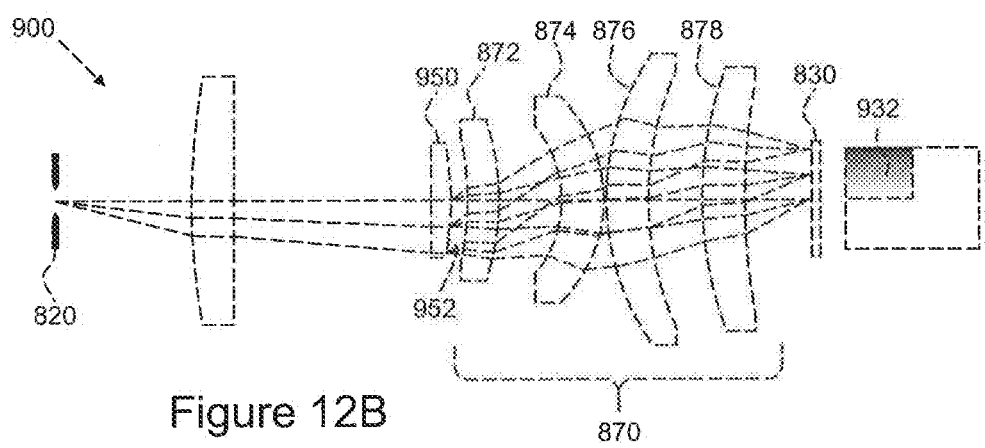

Referring to FIG. 12B, a first segment 952 of the segmented dispersive element 950 imparts a first change in the direction of propagation of a first portion of the light that is incident upon the first segment 952 and disperses the light according to wavelength. This redirected and dispersed first portion of the light is then incident on a second portion 870 of the imaging optical system comprising refractive elements 872, 874, 876, and 878, which is capable of substantially receiving the light from the first segment 952 of the segmented dispersive element 950 and substantially focusing the light to a detector 930. The change in the direction of propagation of the first portion of the light imparted by the first segment 952 of the segmented dispersive element 950 imparts a first shift in the spatial location of the dispersed image 932 on the detector 930.

Figure 12C:
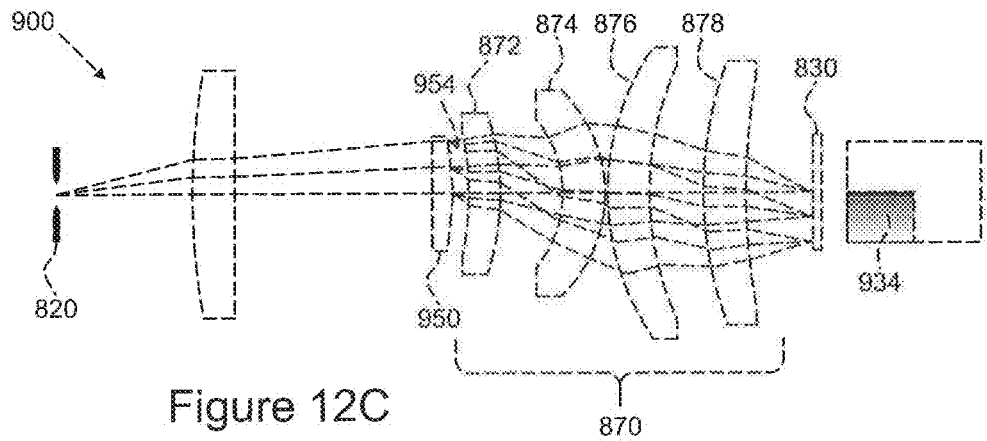

Referring to FIG. 12C, a second segment 954 of the segmented dispersive element 950 imparts a second change in the direction of propagation of a second portion of the light that is incident upon the second segment 954 and disperses the light according to wavelength. This redirected and dispersed second portion of the light is then incident on the second portion 870 of the imaging optical system, which is capable of substantially receiving the light from the second segment 954 of the segmented dispersive element 950 and substantially focusing the light to the detector 930. The change in the direction of propagation of the second portion of the light imparted by the second segment 954 of the segmented dispersive element 950 imparts a second shift in the spatial location of the dispersed image 934 on the detector 930.

This reimaging and redirection of the source occurs for the portions of the light that are incident on the segments 952, 954, 956, 958 of the segmented dispersive element 950, resulting in a plurality of dispersed images 932, 934, 936, 938 respectively on the detector 930 that are spatially located at substantially different locations on the detector 930. The redirection properties of the individual segments 952, 954, 956, 958 of the segmented dispersive element 950 can be designed to place the associated images on the detector 930 at predefined locations, such as but not limited to a tiled non-overlapping pattern. The dispersive properties of the individual segments of the segmented dispersive element 950 can be designed to provide dispersed imagery from different portions of the electromagnetic spectrum or different spectral resolutions or different polarizations or any combination of these attributes at the detector 950.

Figure 13:
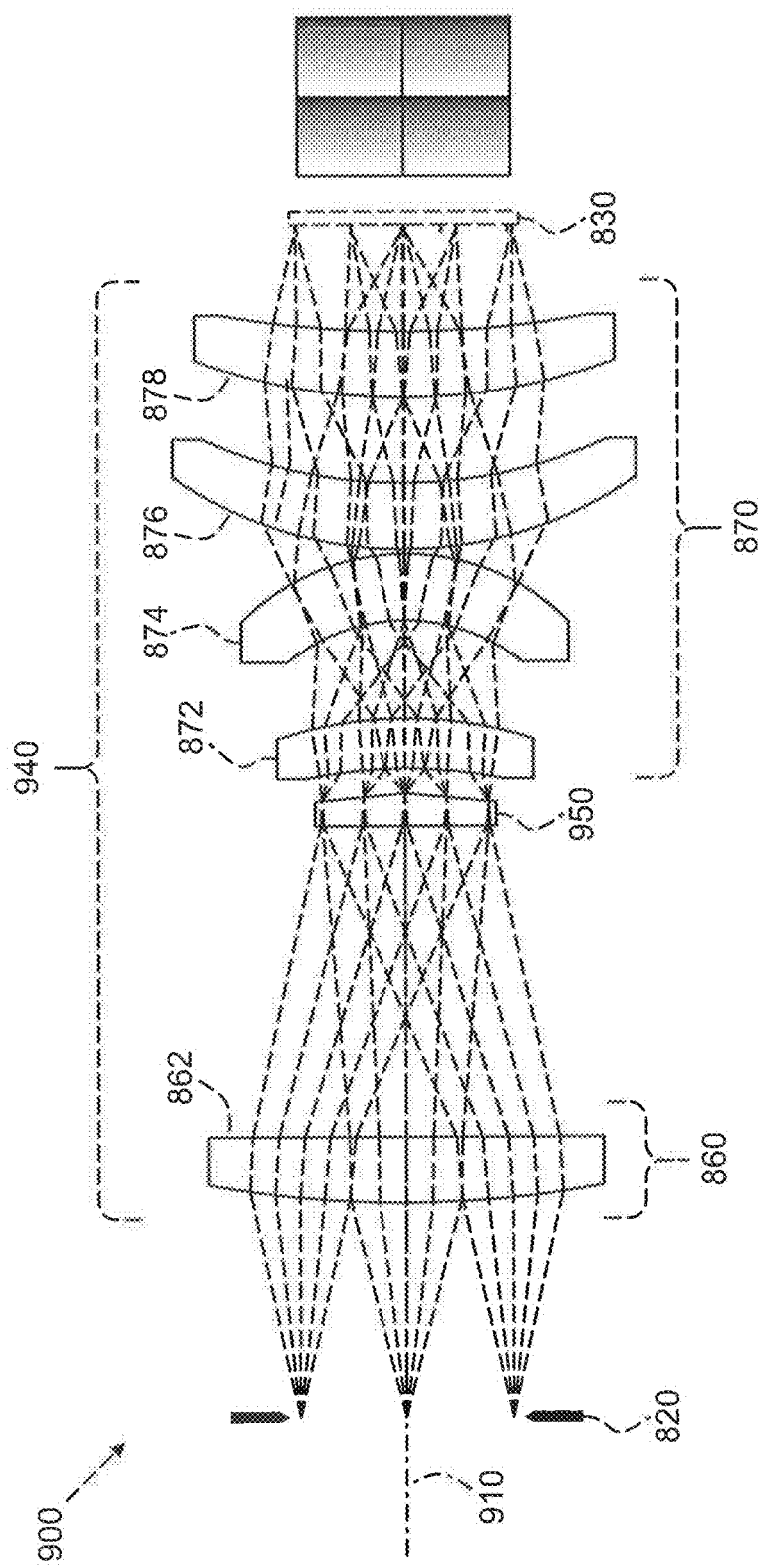
FIG. 13 is a schematic view of the optical imaging system illustrated in FIG. 11, taken along its optical axis in the plane perpendicular to the direction of dispersion in accordance with an embodiment of the present disclosure.

Reference is made to FIG. 13, which is a schematic view of the embodiment of the imaging optical system 900 illustrated in FIG. 11, taken along its optical axis 910 in the plane perpendicular to the direction of dispersion. Light emitted or reflected by a source located substantially at the slit element 820 is incident on the first portion 860 of the imaging optical system, which is capable of substantially collimating the light. The light is then incident on the segmented dispersive element 950, which is capable of separating the light into multiple portions.

The first segment 952 of the segmented dispersive element 950 imparts a first change in the direction of propagation of a first portion of the light that is incident upon the first segment 952 and disperses the light according to wavelength. This redirected and dispersed first portion of the light is then incident on a second portion 870 of the imaging optical system, which is capable of substantially focusing the light to a detector 930.

The second segment 954 of the segmented dispersive element 950 imparts a second change in the direction of propagation of a second portion of the light that is incident upon the second segment 954 and disperses the light according to wavelength. This redirected and dispersed second portion of the light is then incident on the second portion 870 of the imaging optical system, which is capable of substantially focusing the light to the detector 930.

This reimaging and redirection of the source occurs for the portions of the light that are incident on the segments 952, 954, 956, and 958 of the segmented dispersive element 950, resulting in a plurality of dispersed images 932, 934, 936, and 938 respectively on the detector 930 that are spatially located at substantially different locations on the detector 930.

Figure 14:
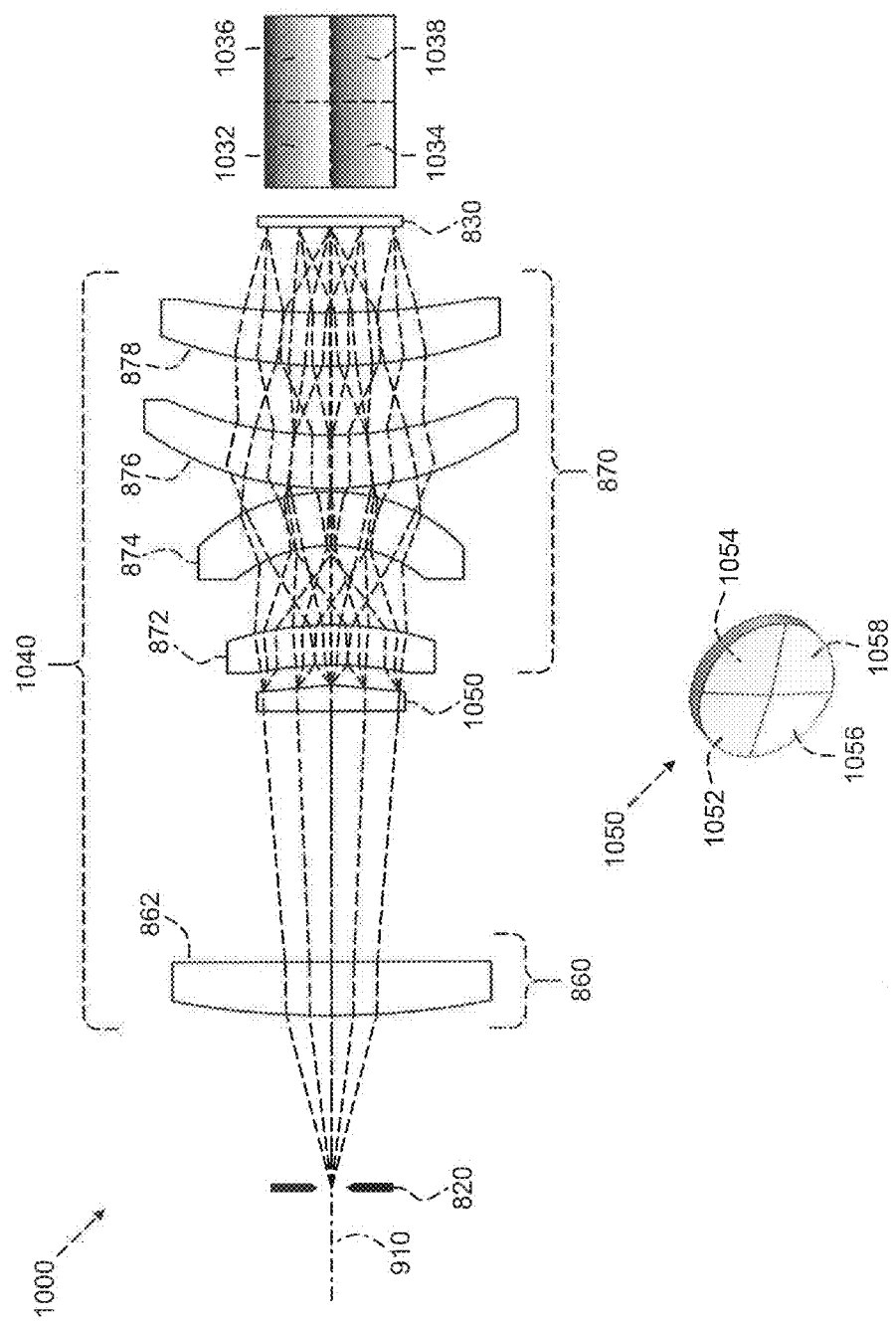
FIG. 14 is a schematic view of an optical imaging system taken along its optical axis in the plane parallel to the direction of dispersion, in accordance with an embodiment of the present disclosure.

FIG. 14 is a schematic view of the optical imaging system illustrated in FIG. 11, taken along its optical axis in the plane parallel to the direction of dispersion in accordance with an embodiment of the present disclosure. In this embodiment, individual segments of the segmented dispersing element 950 of optical imaging system 900 illustrated in FIG. 11 further comprises individual polarization optical filters on each of the segments 952, 954, 956, and 958 on the segmented dispersing element 950, such that the individual dispersed images 932, 934, 936, and 938 on the detector 930 have different polarization content, as illustrated in the schematic view of FIG. 14, taken along its optical axis in the plane parallel to the direction of dispersion. In this embodiment, the optical imaging system behaves similarly to a polarimetric hyperspectral imager that is more compact than conventional designs. In practice, this design can be used to acquire the four Stokes vector components and provide the polarization content of the object as a function of wavelength.

Referring to FIG. 14, light emitted or reflected by a source located substantially at a slit element 820 is incident on a first portion 860 of an imaging optical system comprising refractive element 862, which is capable of substantially receiving a portion of the light emanating from the object plane 820 and substantially collimating the light. The light is then incident upon a segmented dispersing element 1050, which is capable of substantially receiving the light from the first portion 860 of the optical system and separating the light into multiple portions and dispersing the light according to its wavelength.

A first segment 1052 of the segmented dispersing element 1050, which is capable of substantially receiving a first polarization portion of the light, imparts a first change in the direction of propagation of the first portion of the light that is incident upon the first segment 1052 and disperses the light according to wavelength. This redirected and dispersed first polarization portion of the light is then incident on a second portion 870 of the imaging optical system comprising refractive elements 872, 874, 876, and 878, which is capable of substantially receiving the first polarization portion of the light from the first segment 1052 of the segmented dispersing element 1050 and substantially focusing the light to the detector 830. The change in the direction of propagation of the first polarization portion of the light imparted by the first segment 1052 of the segmented dispersing element 1050 imparts a first shift in the spatial location of the dispersed polarization image 1032 on the detector 830.

A second segment 1054 of the segmented dispersing element 1050, which is capable of substantially receiving a second polarization portion of the light, imparts a second change in the direction of propagation of the second portion of the light that is incident upon the second segment 1054 and disperses the light according to wavelength. This redirected and dispersed second polarization portion of the light is then incident on the second portion 870 of the imaging optical system, which is capable of substantially receiving the second polarization portion of the light from the second segment 1052 of the segmented dispersing element 1050 and substantially focusing the light to the detector 830. The change in the direction of propagation of the second polarization portion of the light imparted by the second segment 1054 of the segmented dispersing element 1050 imparts a second shift in the spatial location of the dispersed polarization image 1034 on the detector 830. This reimaging and redirection of the source occurs for the portions of the light that are incident on the segments 1052, 1054, 1056, and 1058 of the segmented dispersing element 1050, resulting in a plurality of dispersed polarization images 1032, 1034, 1036, and 1038 respectively on the detector 830 that are spatially located at substantially different locations on the detector 830.

Figure 15A:
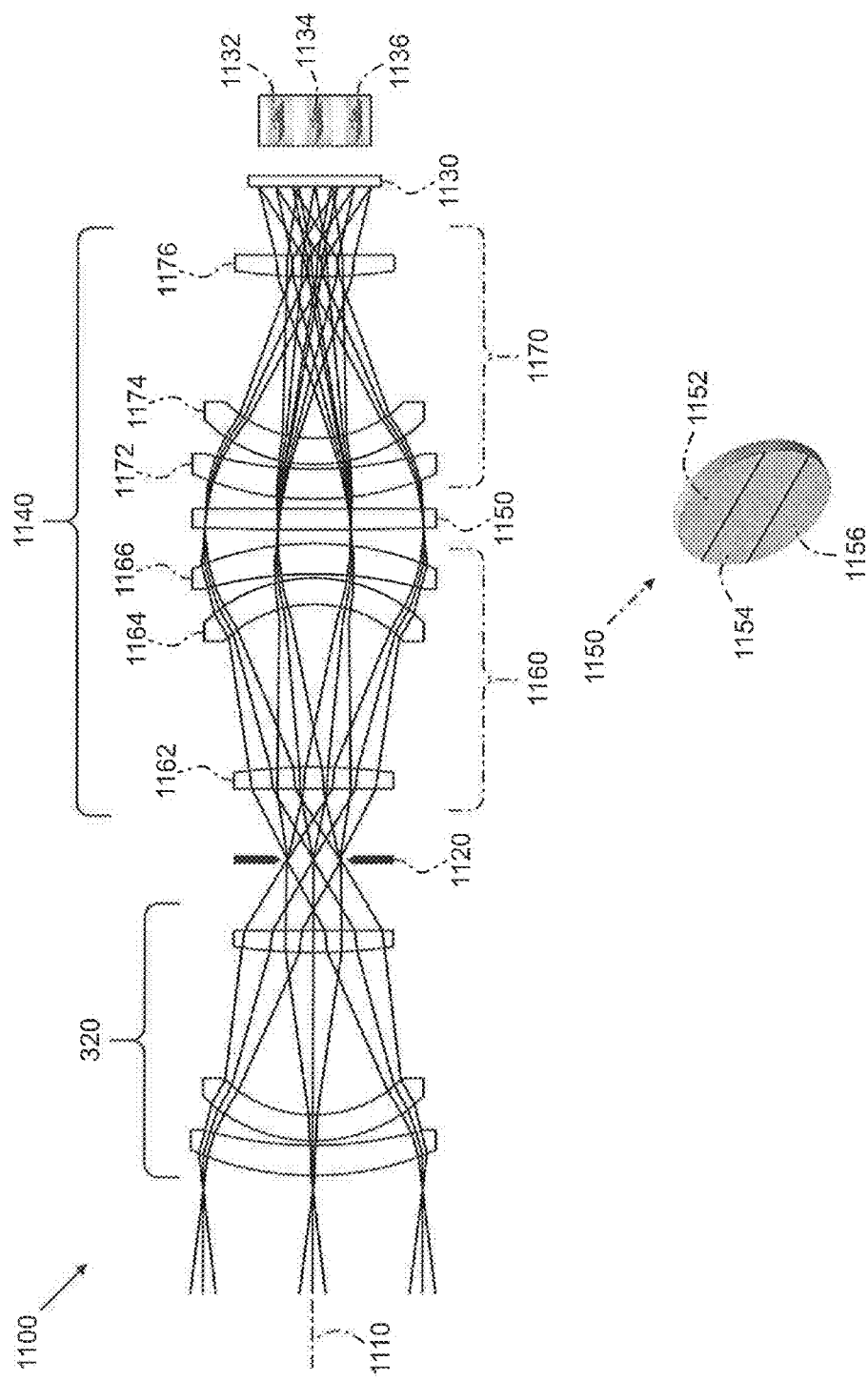
FIG. 15A is a schematic view of an optical imaging system taken along its optical axis in the plane parallel to the image segmentation, in accordance with an embodiment of the present disclosure.

FIG. 15A is a schematic view of an optical imaging system 1100, taken along its optical axis in the plane parallel to the image segmentation, in accordance with an embodiment of the present disclosure. In this embodiment, light emitted or reflected by a source is incident on an imaging lens 320 comprising refractive or reflective elements or combination thereof, the working principles of which may be known in the art, and substantially focused onto an intermediate image plane, as illustrated in the schematic view of FIG. 15A, taken along its optical axis 1110. A field stop 1120 is located substantially at the intermediate image plane, which is capable of substantially receiving a portion of the light emanating from the imaging lens 320.

The light is then incident on a first portion 1160 of an imaging optical system, comprising refractive elements 1162, 1164, and 1166, which is capable of substantially receiving a portion of the light emanating from the field stop 1120 and substantially collimating the light. The light is then incident upon a segmented light bending element 1150, such as but not limited to a segmented prism, which is capable of substantially receiving the light from the first portion 1160 of the optical system and separating the light into multiple portions.

A first segment 1152 of the segmented prism 1150, which is capable of substantially receiving a first portion of the light, imparts a first change in the direction of propagation of the first portion of the light that is incident upon the first segment 1152. This redirected first portion of the light is then incident on a second portion 1170 of the imaging optical system comprising refractive elements 1172, 1174, and 1176, which is capable of substantially receiving the first portion of the light from the first segment 1152 of the segmented prism 1150 and substantially focusing the light to the detector 1130. The change in the direction of propagation of the first portion of the light imparted by the first segment 1152 of the segmented prism 1150 imparts a first shift in the spatial location of the image 1132 on the detector 1130.

A second segment 1154 of the segmented prism 1150, which is capable of substantially receiving a second portion of the light, imparts a second change in the direction of propagation of the second portion of the light that is incident upon the second segment 1154. This redirected second portion of the light is then incident on the second portion 1170 of the imaging optical system, which is capable of substantially receiving the second portion of the light from the second segment 1152 of the segmented prism 1150 and substantially focusing the light to the detector 1130. The change in the direction of propagation of the second portion of the light imparted by the second segment 1154 of the segmented prism 1150 imparts a second shift in the spatial location of the image 1134 on the detector 1130.

This reimaging and redirection of the source occurs for the portions of the light that are incident on the segments 1152, 1154, and 1156 of the segmented prism 1150, resulting in a plurality of images 1132, 1134, and 1136 respectively on the detector 1130 that are spatially located at substantially different locations on the detector 1130. In this embodiment, the segmented prism 1150 is divided into a linear sequence of three segments 1152, 1154, and 1156, but in practice the number and orientation of segments can be of any configuration desired.

Figure 15B:
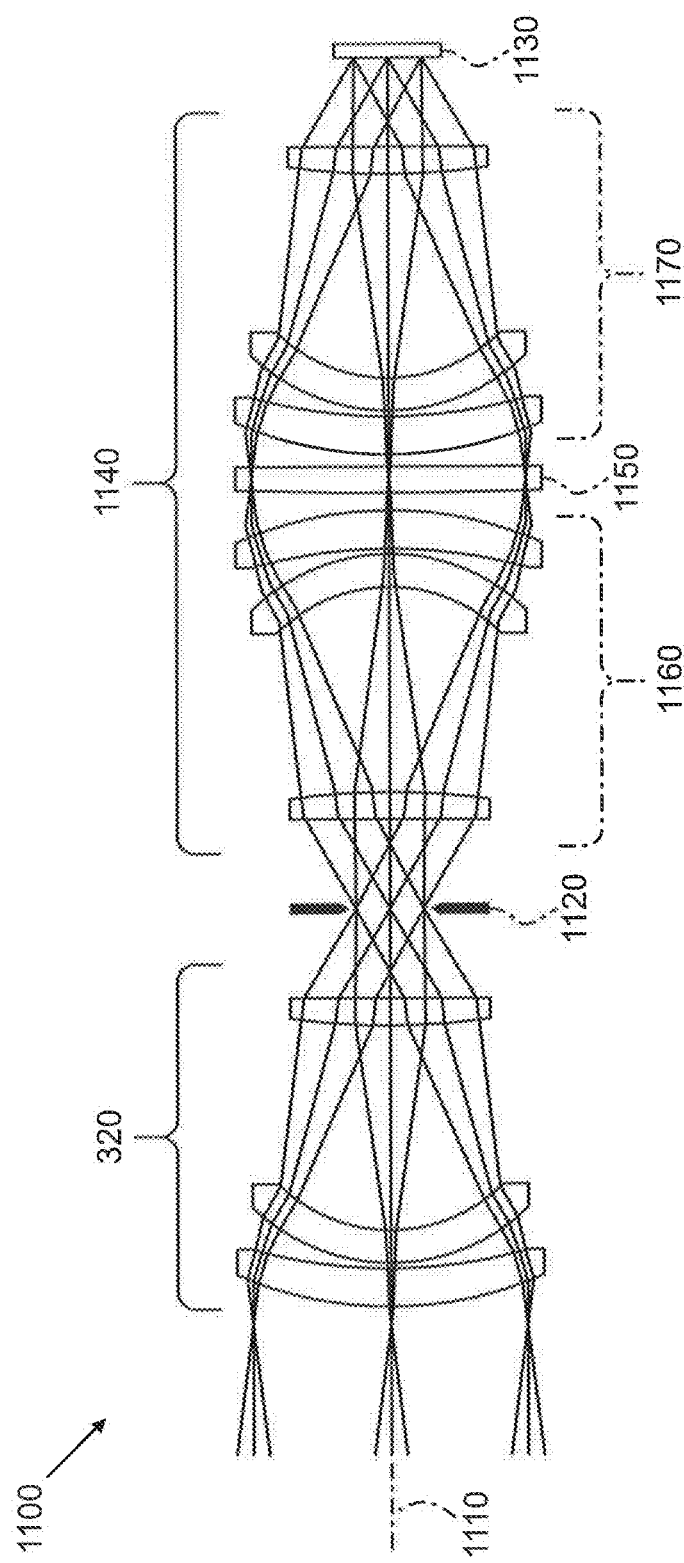
FIG. 15B is a schematic view of the optical imaging system illustrated in FIG. 15A, taken along its optical axis in the plane perpendicular to the image segmentation, in accordance with an embodiment of the present disclosure.

Reference is made to FIG. 15B, which is a schematic view of imaging optical system 1100 illustrated in FIG. 15A, taken along its optical axis 1110 in the plane perpendicular to the direction of the division of the individual segments 1152, 1154, and 1156 in the segmented prism 1150. Light emitted or reflected by a source is incident on the imaging lens 320 and substantially focused onto an intermediate image plane. A field stop 1120 is located substantially at the intermediate image plane, which is capable of substantially receiving a portion of the light emanating from the imaging lens 320. Light is then incident on the first portion 1160 of the imaging optical system, which is capable of substantially collimating the light. The light is then incident on the segmented prism 1150, which is capable of separating the light into multiple portions.

The first segment 1152 of the segmented prism 1150 imparts a first change in the direction of propagation of a first portion of the light that is incident upon the first segment 1152. This redirected first portion of the light is then incident on a second portion 1170 of the imaging optical system, which is capable of substantially focusing the light to a detector 1130.

The second segment 1154 of the segmented prism 1150 imparts a second change in the direction of propagation of a second portion of the light that is incident upon the second segment 1154. This redirected second portion of the light is then incident on the second portion 1170 of the imaging optical system, which is capable of substantially focusing the light to the detector 1130.

This reimaging and redirection of the source occurs for the portions of the light that are incident on the segments 1152, 1154, and 1156 of the segmented prism 1150, resulting in a plurality of dispersed images 1132, 1134, and 1136 respectively on the detector 1130 that are spatially located at substantially different locations on the detector 1130.

The segmented light bending element, particularly when combined with spectral or polarization filters or dispersive surfaces, can be readily interchanged with other segmented light bending elements to provide the user with a degree of modularity not available in conventional imaging systems that allows the imaging characteristics of the pupil division multiplexed imagers of the present disclosure to be easily modified to meet different imaging requirements.

As used herein, the singular forms "a," "an," and "the" include the plural reference unless the context clearly dictates otherwise. Except where otherwise indicated, all numbers expressing quantities of ingredients, reaction conditions, and so forth used in the specification and claims are to be understood as being modified in all instances by the term "about."

For the purpose of better describing and defining the present disclosure, it is noted that terms of degree (e.g., "substantially," "about," and the like) may be used in the specification and/or in the claims. Such terms of degree are utilized herein to represent the inherent degree of uncertainty that may be attributed to any quantitative comparison, value, measurement, and/or other representation. The terms of degree may also be utilized herein to represent the degree by which a quantitative representation may vary (e.g., ±10%) from a stated reference without resulting in a change in the basic function of the subject matter at issue.

Although embodiments of the present teachings have been described in detail, it is to be understood that such embodiments are described for exemplary and illustrative purposes only. Various changes and/or modifications may be made by those skilled in the relevant art without departing from the spirit and scope of the present disclosure as defined in the appended claims.

What is claimed is:

1. An imaging optical system, comprising:
a first optical sub-system having at least one optical element, said first optical sub-system being configured to substantially collimate, at a center plane, electromagnetic radiation emanating from an object plane;
at least one segmented light bending element substantially located at the center plane; said at least one segmented light bending element comprising a plurality of segments, each segment in said plurality of segments being configured to direct a portion of said electromagnetic radiation along a direction in a plurality of directions; wherein each direction in said plurality of directions is substantially different from the other directions in said plurality of directions; said at least one segmented light bending element being configured to separate said electromagnetic radiation into a plurality of portions;
a second optical sub-system having at least one optical element, said second optical sub-system being configured to image said plurality of portions of said electromagnetic radiation onto an image plane; and
at least one detecting element substantially located at the image plane.

2. The imaging optical system of claim 1, wherein said at least one optical element is a refractive element.

3. The imaging optical system of claim 1, wherein at least two segments in said plurality of segments in said segmented light bending element are configured to substantially separate said electromagnetic radiation into at least two spectral bands.

4. The imaging optical system of claim 1, wherein at least two segments in said plurality of segments in said segmented light bending element are configured to substantially separate said electromagnetic radiation into at least two polarizations.

5. The imaging optical system of claim 1, wherein at least one segment in said plurality of segments in said segmented light bending element is configured to substantially disperse a portion of said electromagnetic radiation according to wavelengths of said electromagnetic radiation.

6. An imaging optical system, comprising:
a first optical sub-system having at least one optical element, said first optical sub-system being configured to substantially collimate, at a center plane, electromagnetic radiation emanating from an object plane;
at least one dispersive element substantially located at the center plane, and at least one segmented light bending element substantially located at the center plane, wherein said at least one segmented light bending comprising a plurality of segments, each segment in said plurality of segments being configured to direct a portion of said electromagnetic radiation alone a direction in a plurality of directions; wherein each direction in said plurality of directions is substantially different from the other directions in said plurality of directions;
a second optical sub-system having at least one optical element, said second optical sub-system being configured to substantially image said at least two portions of said electromagnetic radiation onto an image plane; and
at least one detecting element substantially located at the image plane.

7. The imaging optical system of claim 6, wherein said at least one optical element is a refractive element.

8. The imaging optical system of claim 6, wherein said at least one dispersive element is optically disposed between said first optical sub-system and said segmented light bending element.

9. The imaging optical system of claim 6, wherein said at least one dispersive element is optically disposed between said segmented light bending element and said second optical sub-system.

10. The imaging optical system of claim 6, wherein at least two segments in said plurality of segments in said segmented light bending element are capable of substantially separating said electromagnetic radiation substantially into at least two spectral bands.

11. The imaging optical system of claim 6, wherein at least two segments in said plurality of segments in said segmented light bending element are capable of substantially separating said electromagnetic radiation substantially into at least two polarizations.

12. A method for detecting light, the method comprising:
substantially collimating electromagnetic radiation emanating from a source;
spatially separating the substantially collimated electromagnetic radiation into at least two substantially non-overlapping portions;
directing each portion of said at least two substantially non-overlapping portions into a different direction from at least two directions;
imaging said at least two substantially non-overlapping portions of the angularly separated electromagnetic radiation onto at least one detecting element; and
detecting the separated electromagnetic radiation.

13. A method for detecting at least two portions of wavelength dependent content of electromagnetic radiation, the method comprising:
substantially collimating electromagnetic radiation emanating from a source;
spatially separating the substantially collimated electromagnetic radiation into at least two substantially non-overlapping wavelength portions;
directing each portion of said at least two substantially non-overlapping portions into a different direction from at least two directions;
angularly separating said at least two wavelength portions into at least two optical portions;
imaging said at least two optical portions onto at least one detecting element; and
detecting said at least two optical portions of said at least two wavelength portions of said electromagnetic radiation.

14. The imaging optical system of claim 1, wherein said at least one segmented light bending element comprises two segments; said at least one segmented light bending element being configured to substantially separate said electromagnetic radiation into at least two portions; said at least one segmented light bending element being configured to redirect said at least two portions of said electromagnetic radiation into substantially different directions.

15. The imaging optical system of claim 14, wherein said at least one segmented light bending element further comprises a third segment being configured to direct a third portion of said electromagnetic radiation along a third direction; wherein the third direction is substantially different from the second direction and the first direction.

16. The imaging optical system of claim 14, wherein the first, second, and third segments of said at least one segmented light bending element are arranged in a substantially linear sequence of three segments.

17. The imaging optical system of claim 14, wherein said at least one segmented light bending element further comprises a fourth segment being configured to direct a fourth portion of said electromagnetic radiation along a fourth direction; wherein the fourth direction is substantially different from the third direction, the second direction, and the first direction.

18. The imaging optical system of claim 16, wherein each of the first, second, third, and fourth segments of said at least one segmented light bending element are arranged substantially as quadrants of the segmented light bending element.

* * * * *